F. W. ROLLER.
ELECTRICAL MEASURING INSTRUMENT.
APPLICATION FILED JULY 15, 1907.
1,050,694.
Patented Jan. 14, 1913.
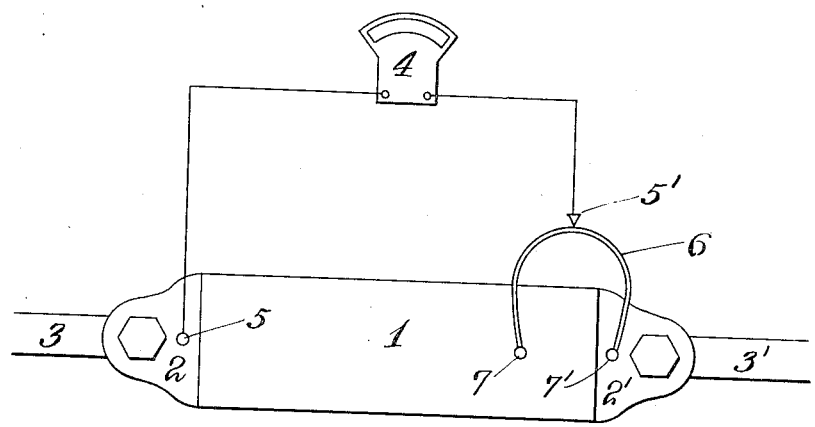
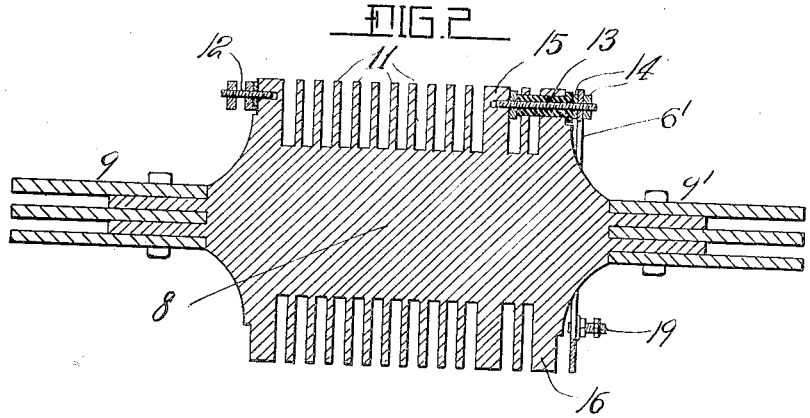
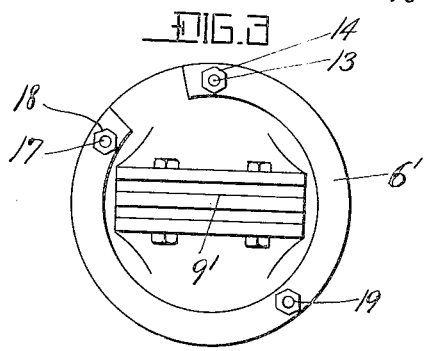
Witnesses
Geo. A. Hoffman
Montville Strickland
Frank W. Roller Inventor
By his Attorneys
Edwards, Sager & Wooster

UNITED STATES PATENT OFFICE.

FRANK W. ROLLER, OF EAST ORANGE, NEW JERSEY, ASSIGNOR TO ROLLER-SMITH COMPANY, A CORPORATION OF NEW YORK.

ELECTRICAL MEASURING INSTRUMENT.

1,050,694.  Specification of Letters Patent.  Patented Jan. 14, 1913.

Application filed July 15, 1907. Serial No. 383,895.

*To all whom it may concern:*

Be it known that I, FRANK W. ROLLER, a citizen of the United States, residing at East Orange, in the county of Essex and State of New Jersey, have invented certain new and useful Improvements in Electrical Measuring Instruments, of which the following is a full, clear, and exact specification.

My invention relates to electrical measuring instruments, and particularly to means for measuring currents of comparatively large value. In the measurement of large currents it is customary to use a shunt in the main circuit and associate therewith a sensitive measuring instrument which will be subjected to the drop in potential which occurs in the shunt. The drop in potential is of course dependent upon the strength of current passing through the shunt and the instrument will therefore indicate the amount of main current passing after being suitably calibrated. In the manufacture of shunts for any given capacity, absolute uniformity in size and resistance is difficult if not commercially impossible, and the variation is sufficient to cause considerable variation in the readings when different shunts are used in conjunction with a given measuring instrument. In practice, this difficulty is usually overcome by providing an instrument for each shunt and calibrating the instrument when used in connection with this particular shunt. In this way substantially accurate readings are obtained when an instrument is used in conjunction with its shunt, but if used with any other shunt, or if the same shunt is used with any other instrument, serious inaccuracies will result. The shunts and instruments are therefore not interchangeable, and this absence of interchangeability is objectionable to the user as well as to the manufacturer not only on account of the inconvenience, but also the increased cost to both parties. In an endeavor to overcome this difficulty, the shunt after manufacture may be tested and afterward changed in its form or proportions so as to give a certain standard drop in potential when a current of the capacity of the shunt is passed through the same. This may require several successive tests and changes in the shunt. This method, however, is tedious and considerably increases the cost of manufacture and is not readily applicable to all forms of shunts. One method which approaches the obtaining of interchangeable shunts to some degree consists in testing the shunt with a standard instrument and adjusting one or both of the contact leads on the instrument to such a point or points in the body of the shunt as to give the desired standard drop in the millivolts. With some forms of shunt this method is not applicable and in all present forms, so far as I am aware, it does not result in a high degree of accuracy. A slight displacement of the point of connection of the leads from its proper position, will cause a wide difference in the reading of the instrument and a point of connection must therefore be exact to secure desired accuracy. On account of this difficulty it is, generally impossible to obtain sufficient accuracy in practice.

By means of my invention, the difficulties and objections above referred to are overcome, and I secure a form of shunt which is not only interchangeable with others, but also a form of shunt which may be readily adjusted to compensate for variations in manufacture.

My invention will be understood from the following description and accompanying drawings, in which—

Figure 1 is a diagram illustrating my invention generally and the principle thereof; Fig. 2 is a cross section of one form of shunt embodying my invention; and Fig. 3 is an end view thereof.

Referring to Fig. 1, the main shunt body 1 is shown as having terminals 2, 2' which are connected to cables or bus-bars 3, 3' and which carry the main current to be measured. The indicating instrument is shown at 4, and its terminals 5, 5' are usually connected to terminal studs at or near the ends of the main shunt. These terminal connections as above stated are at such points usually as to approach uniformity in general, but the inaccuracies are so great that substantial uniformity or interchangeability cannot be obtained. In accordance with my invention, an additional shunt or auxiliary shunt 6 is connected between the two points 7, 7' of the main shunt, these points being so spaced that the standard drop in millivolts will occur between the terminal connection 5 and some point between the points 7, 7'. The resistance of this auxiliary shunt should be high as compared to that of the main shunt so as not to materially affect its resistance and should also be low as compared with the resistance of the indicating instrument. As the strip 6 is subjected to the difference in potential between the terminals of points 7, 7', it follows that a slight current will flow through said strip or conductor, and there must be the same drop in potential in this conductor as in the main shunt between points 7, 7'. Consequently, there is some point in the auxiliary shunt 6 which will be at the same potential as the point in the main shunt to which if the terminal 5' were accurately connected, the standard drop in millivolts would be obtained. Thus, by means of the conductor 6, which may be of considerable length, the point of desired potential may be easily obtained and with a high degree of accuracy. The terminal 5' is indicated as being adjustable along the conductor 6, and contact may therefore be made at any point desired. If this terminal makes contact at such point on conductor or auxiliary shunt 6 that the standard drop in millivolts is obtained, then any standard instrument may be used in place of the instrument 4 and the same readings will be obtained with all instruments within the requirements of practice.

In adjusting the connection 5' to the proper point on the auxiliary shunt 6, the method is as follows: A current of accurately known value is passed through the main shunt and a standard instrument is connected as shown. If the reading of the instrument 4 does not correspond with the known value of the current, the operator will move contact 5' along the conductor or auxiliary shunt 6 until the instrument 4 gives the correct reading. Provision is then made for permanently connecting contact 5' to the conductor or auxiliary shunt 6 at such point. If on first testing the shunt, the reading given by instrument 4 is too low, contact 5' will be moved along conductor 6 toward point 7' until the reading is increased to the known amount. If the reading is too high on first testing the instrument, contact 5' will be moved along conductor 6 toward point 7 until the reading of the instrument is correct. It will be seen that by the use of a long loop 6 a large range of movement of contact 5' is obtained with only a slight change in reading of the instrument, and therefore the proper point of connection is accurately determinable. After the proper point is determined, a permanent contact terminal will be affixed to the conductor at such point and the shunt may then be used interchangeably in connection with any standard instrument.

It will be seen that my invention not only presents the advantage of interchangeability of shunts and ammeters of the same capacity, but also shunts of certain capacities may be used in conjunction with ammeters of different capacities, and vice versa. Thus, by calibrating all shunts to a standard drop of 50 millivolts, for example, a 1000 ampere shunt when used in conjunction with an instrument scaled for 500 amperes will give an accurate reading by multiplying the reading of the instrument by 2, or if used in conjunction with an ammeter scaled for 2000, the correct reading will be obtained by dividing the indication of the needle by 2. This will be understood because if the 1000 ampere current gives a drop of 50 millivolts in the 1000 ampere shunt, the needle of the 500 ampere instrument will be deflected to a reading of 500, because the instrument is calibrated to give such deflection with a drop of 50 millivolts. Consequently, the reading of the instrument should be multiplied by 2 when used with a 1000 ampere shunt. Similarly, when such shunt is used with an ammeter scaled for 2000 amperes capacity, the passage of 1000 amperes will deflect the needle to read 2000 and this divided by 2 will give the correct current. Of course, if desired, double scales may be provided on the instrument and it will also be evident that the construction of instruments for shunts of all capacities are the same, the difference being only in the scale used.

In Figs. 2 and 3, I have illustrated a general form of shunt, such as described in Patent No. 859255, granted to me July 9, 1907, and need not be particularly described herein. The shunt is shown having a body portion 8 and terminals 9, 9' for connection to the bus-bars or conductors carrying the main current to be measured. This main shunt is provided with circular flanges or radiators 11 as referred to in said patent, and a terminal connection for one of the leads from the ammeter is shown at 12. At the opposite end of the shunt is shown a conducting strip, or auxiliary shunt 6' connected at one end by a screw 13 and nuts 14 to an intermediate portion of the main shunt such as the heavy flange or radiator 15, the screw 13 being insulated from other portions of the main shunt. The other end of the conductor, or auxiliary shunt 6' is connected to the face of the outer portion 16 of the main shunt by a screw 17 and nuts 18. The connection at 15 corresponds to the point 7 in Fig. 1, and the connection at 16 corresponds to the connection at point 7' of Fig. 1, and the circular strip or auxiliary shunt 6' corresponds to the conductor 6. At some intermediate point on the auxiliary shunt 6' with current of normal capacity flowing, the potential will be such that between such point and the terminal 12 a standard drop in millivolts will be obtained. This point will be accurately determined by test, and a terminal connection 19 or suitable fixed indication provided at such point. Connection of the ammeter leads between terminals 12 and 19 will thereafter give correct readings of the ammeters. The complete shunt will be interchangeable with any standard ammeter, the leads of such ammeter being connected to the auxiliary shunt 6' at the proper terminal.

Although I have shown in Figs. 2 and 3, a certain form of shunt as an embodiment of my invention which is particularly advantageous for a number of reasons, it will be understood that my invention may be applied to various other types and forms of shunts, and my invention may be embodied in various forms of construction without departing from the scope thereof.

Having thus described my invention, I declare that what I claim as new and desire to secure by Letters Patent, is,—

1. As an article of manufacture, a shunt device for electrical measuring instruments comprising a main shunt having terminals adapted to be connected in the line circuit, and an auxiliary shunt shunting a part of said main shunt, at least one end of said auxiliary shunt being secured to said main shunt.

2. A shunt device for electrical measuring instruments comprising a main shunt having terminals adapted to be connected in the main circuit and a terminal adapted to be connected to a lead of a measuring instrument, a conductor having at least one end thereof connected to said main shunt, said conductor being proportioned to give a lower drop of potential per unit length as compared with the potential drop per unit length in said main shunt, and means for connecting the remaining lead of said measuring instrument to a point on said conductor.

3. As an article of manufacture, a shunt device for ammeters comprising in combination with a main shunt having two terminals adapted to be connected in the line circuit, a terminal adjacent one of said line terminals and adapted to be connected to a lead of an ammeter, of a second terminal adapted to be connected to the other lead of the ammeter, and means whereby a drop in millivolts between said two ammeter terminals equal to a standard amount is obtained when current flows through said main shunt, said means comprising an additional conductor having at least one end thereof secured to said main shunt.

4. The combination with a main shunt for an ammeter, said main shunt having two terminals adapted to be connected in the line circuit and a terminal disposed adjacent one of said line terminals and adapted to be connected to one lead of the ammeter, of a conductor having one end connected to said main shunt adjacent the other of said line terminals and its other end connected to said main shunt at a point which is of different potential when current flows through said main shunt, and a terminal adapted to be connected to the other lead of the ammeter, said last-named terminal being disposed at a point on said conductor intermediate its ends.

5. As an article of manufacture, a shunt device for electrical measuring instruments comprising a main shunt, a conductor mounted adjacent one end of said main shunt, one end of said conductor being secured to said end of said main shunt, and means for securing said conductor to a point intermediate the ends of said main shunt.

6. The combination of a shunt, a conductor located at one end of said shunt, means for connecting the ends of said conductor to points of different potential in said shunt, and means for connecting one of the leads of an indicating instrument to said conductor and the other to said shunt.

7. The combination of a shunt, a conductor located at one end of said shunt and encircling the end thereof, and means for connecting the ends of said conductor to different points of said shunt.

8. The combination of a shunt having radiators extending from the body thereof, a conductor located at and encircling the end of said shunt, and means for connecting the ends of said conductor to different points of said shunt.

9. The combination of a shunt having radiators extending form the body thereof, a conductor located at and encircling the end of said shunt, means for connecting the ends of said conductor to different points of said shunt, and means for connecting one of the leads of an indicating instrument to an intermediate point of said conductor and the other lead to said shunt.

10. The combination with a shunt for an ammeter, said shunt having two terminals adapted to be connected in the main circuit and a terminal adapted to be connected to one lead of the ammeter, of a conductor of less cross-section than said shunt having one end connected to said shunt adjacent one of said line terminals and its other end connected to said shunt at a point which is of different potential when current flows through said shunt, and a terminal adapted to be connected to the remaining lead of the ammeter, said last named terminal being disposed at a point on said conductor intermediate its ends.

In testimony whereof I affix my signature, in presence of two witnesses.

FRANK W. ROLLER.

Witnesses:
L. K. SAGER,
GEO. A. HOFFMAN.